(12) United States Patent
Pullen et al.

(10) Patent No.: US 6,366,664 B1
(45) Date of Patent: Apr. 2, 2002

(54) METHOD AND SYSTEM FOR TRANSLATING CALL PROCESSING REQUESTS

(75) Inventors: Steve M. Pullen, Rowlett; Daniel M. Spencer, Florence; Mario Monteiro, Garland; Navdeep G. Singh; Joseph E. Walker, both of Plano; Steven R. Carson, Allen, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/510,105

(22) Filed: Feb. 22, 2000

Related U.S. Application Data

(62) Division of application No. 08/941,685, filed on Sep. 30, 1997.

(51) Int. Cl.⁷ .................................................. H04M 7/00
(52) U.S. Cl. ................ 379/237; 379/91.01; 379/114.14; 379/235
(58) Field of Search ................... 379/128, 229, 379/233, 237, 216, 258, 192, 243, 201.02, 142.11, 142.1

(56) References Cited

U.S. PATENT DOCUMENTS

| 5,343,517 | A | * | 8/1994 | Bogart et al. | ............... | 379/219 |
|---|---|---|---|---|---|---|
| 5,467,388 | A | * | 11/1995 | Redd, Jr. et al. | ........... | 379/142 |
| 5,511,116 | A | | 4/1996 | Shastry et al. | ............... | 379/201 |
| 5,621,787 | A | | 4/1997 | McKoy et al. | .............. | 379/144 |
| 5,640,446 | A | | 6/1997 | Everett et al. | .............. | 379/115 |
| 5,757,899 | A | * | 5/1998 | Boulware et al. | ........... | 379/196 |
| 5,825,857 | A | | 10/1998 | Reto et al. | .................. | 379/114 |

FOREIGN PATENT DOCUMENTS

| EP | 0726682 | 8/1996 | ............ H04Q/3/00 |
|---|---|---|---|
| WO | 9614704 | 5/1996 | ............ H04M/3/42 |
| WO | 9735445 | 9/1997 | ............ H04Q/3/42 |

* cited by examiner

Primary Examiner—Curtis Kuntz
Assistant Examiner—Rexford N Barnie
(74) Attorney, Agent, or Firm—Baker Botts L.L.P.

(57) ABSTRACT

A generic translator (10) is provided for processing service requests sent by a digit collection client (16). Requests include billing validation (11), call routing (19), call screening (17), account code validation (15) or other services. These requests are processed by the generic translator (10) and successful results are sent back to the digit collection client (16) or a trunk selection process (20). The generic translator (10) can access an external entity (18) to assist in digit translation (13).

10 Claims, 16 Drawing Sheets

METHOD AND SYSTEM FOR TRANSLATING CALL PROCESSING REQUESTS

This application is a divisional of U.S. application Ser. No. 08/941,685 filed Sep. 30, 1997.

TECHNICAL FIELD OF THE INVENTION

The present invention relates in general to the field of telecommunications. More particularly, the present system relates to a method and system for translating call processing requests.

BACKGROUND OF THE INVENTION

In a telecommunication system, before a call is connected between an originating party and a terminating party, the call may undergo one or more screening or validation services. For example, before a call is connected, an account code may have to be entered and validated. Also, billing to a particular credit card, calling card or phone number may have to be identified. Calls may also be screened to see if a particular call is permitted at a certain time of day. Calls may also be screened and rejected based on the number of the calling party. Additionally, call routing may occur based on the number called or other factors.

In order to most efficiently provide such services, as well as other services related thereto, a translator capable of translating the dialed digit and then executing the services is required.

SUMMARY OF THE INVENTION

In accordance with the present invention, a system and method for digit translating in a telecommunication network is provided which provides the needed functionality.

In one aspect of the present invention, a telecommunications system for performing call processing request is provided. The system includes a digit collector operable to receive input digits and formulate a call processing request therefrom and a generic translator operable to receive and process the call processing request. The generic translator can further generate a billing validation response in response to the call processing request being a billing validation request, the billing validation response being returned to the digit collector. The generic translator is also operable to generate a translated digits response in response to the call processing request being a digit translation request which is successfully translated, the translated digits response being sent to a trunk selector. The generic translator can also generate a translation failure response in response to the call processing request being a digit translation request which is not successfully translated, the translated failure response being sent to a call sequencer.

In another aspect, a method for translating call processing requests is given. The method includes the steps of receiving a call processing request from a digit collection client, processing the call processing request in a generic translator and sending an output message to a process client.

An important technical advantage of the present invention includes providing a way to provide digit translation services in a platform independent environment that is both extensible and flexible. Other technical advantages are readily apparent to one skilled in the art from the following FIGURES, descriptions and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

The preferred embodiment of the present invention and its advantages are best understood by referring to FIGS. 1–15 of the drawings, like numerals used for like and corresponding parts of the various drawings.

The generic translator of the present invention is designed to provide a framework from which specific customer applications can be developed. Specific use cases will be discussed first, followed by a discussion of the framework of the generic translator.

Figure 1:
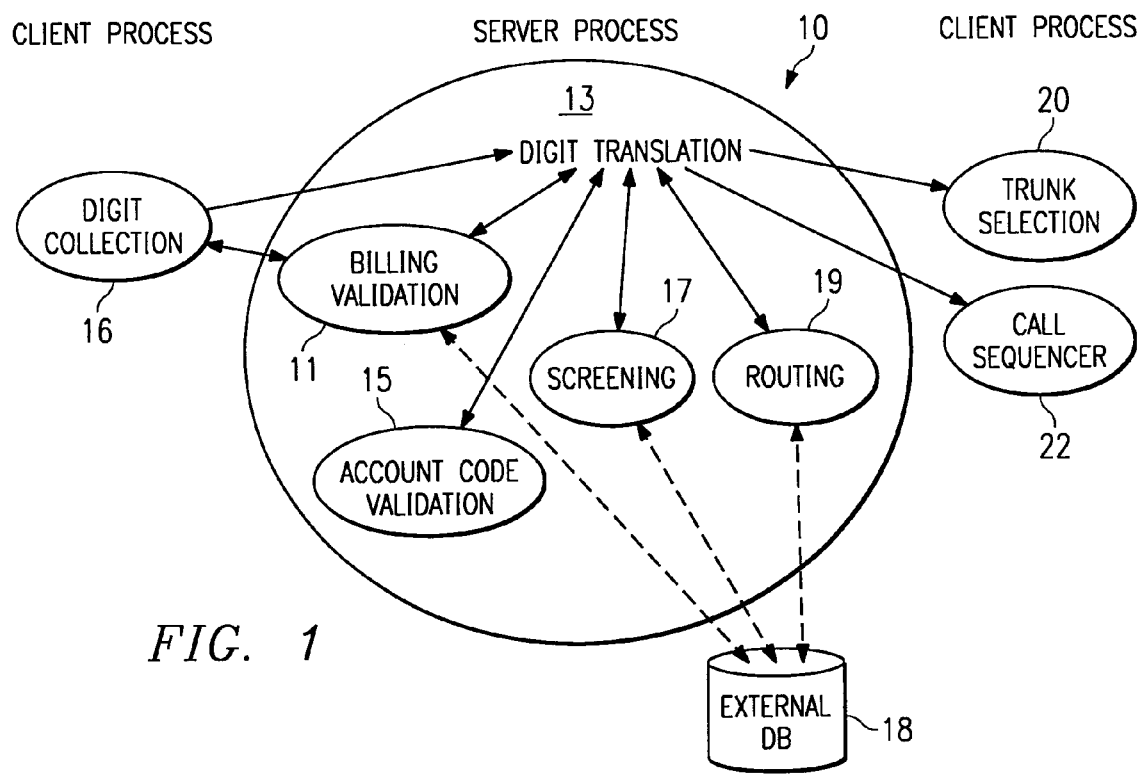
FIG. 1 is a simplified block diagram of a generic translator as part of a client/server process according to an embodiment of the present invention.

FIG. 1 is a simplified block diagram of a generic translator as part of a client/server process. A digit collection client 16 formulates and sends a request for a billing validation 11 or a digit translation 13 to a generic translator 10. Billing validation 11 is performed in generic translator 10 with assistance from digit translation 13 and optionally, an external database located at a service control point (SCP) 18. A response to billing validation 11 is sent back to digit collection client 16. Request for digit translation 13 may include requests for account code validation 15, call screening 17 or call routing 19. If a request is successful, a message is sent to a trunk selection process 20. If a request is unsuccessful, a failure message is sent to a call sequencer 22.

Figure 2:
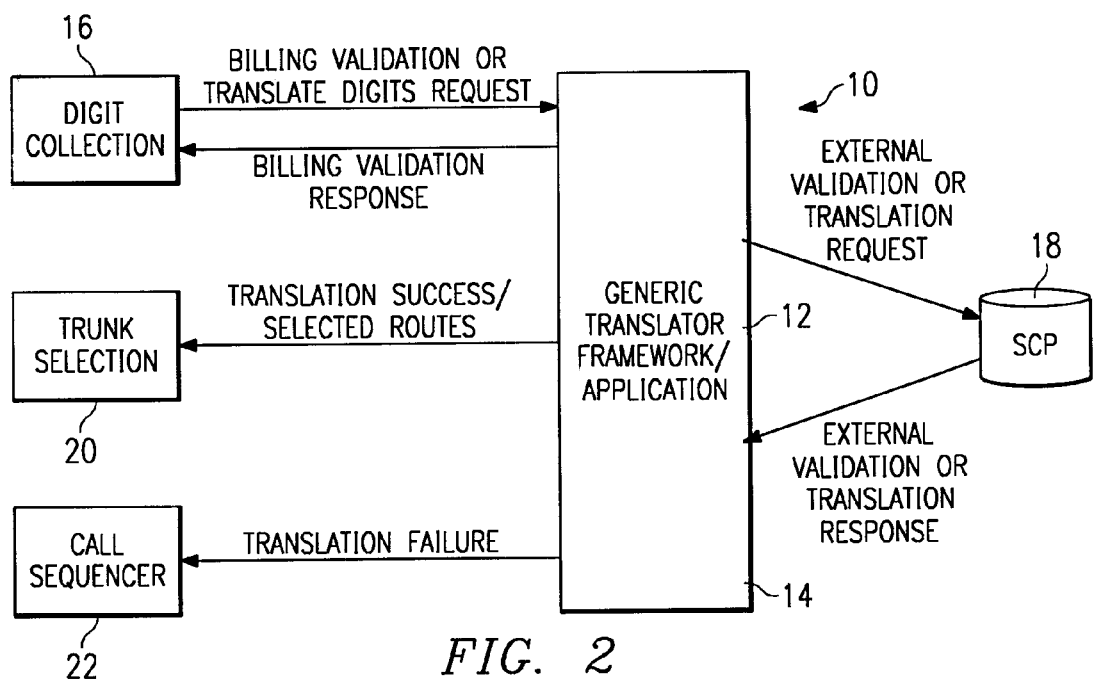
FIG. 2 is a block diagram of a generic translator constructed according to an embodiment of the present invention.

FIG. 2 is a block diagram of generic translator 10 according to the teachings of the present invention. Generic translator 10 is comprised of a generic translator framework 12 and a generic translator application component 14. Digit collection client 16 sends generic translator 10 a request for billing validation 11, call routing 19, call screening 17, account code validation 15 or some other digit translation request. Digit collection client 16 can be in the form of inband, SS7, ISDN or some other communication protocol. If the request is for billing validation, generic translator 10 performs the translation and validation and sends the results back to digit collection client 16.

If the request is for digit translation 13, generic translator 10 performs the translation, and sends a message containing successfully translated digits to trunk selection process 20 to complete the call. Unsuccessful requests result in a failure message being sent to call sequencer 22. If necessary, service control point 18 can be queried to assist in validation or translation requests.

Figure 3:
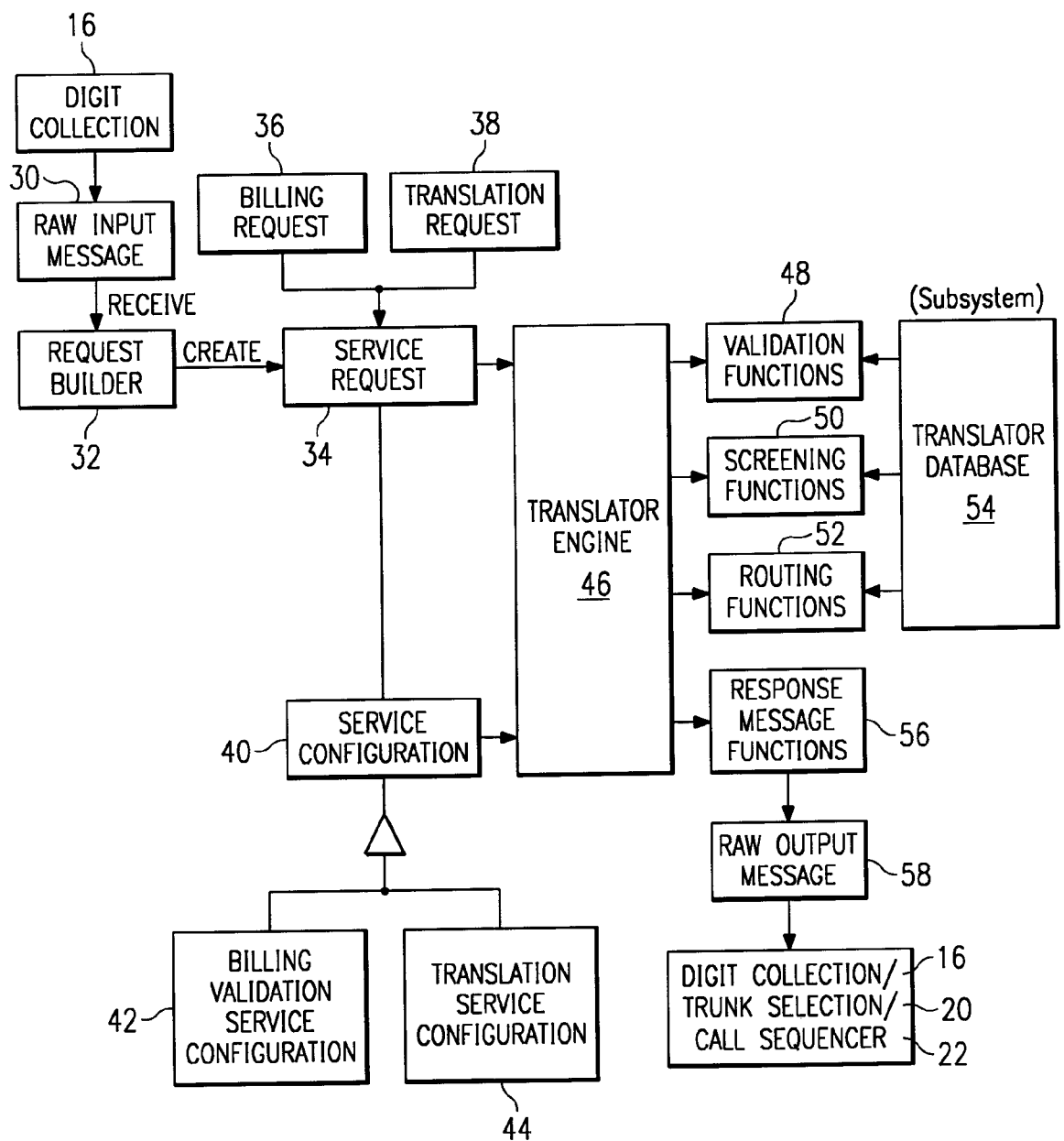
FIG. 3 is an object model for a generic translator constructed according to an embodiment of the present invention.

FIG. 3 is an exemplary object model for generic translator 10 according to the teachings of the present invention. A raw input message 30 is received by a request builder 32 from digit collection 16. Request builder 32 receives raw input message 30 and creates a service request object 34. Service request object 34 contains client request information in a generic form. A billing request 36, containing billing data, billed type, billed number, secondary billing information and prevalidated billing information, may be provided to service request 34. A translation request 38, containing the translate digit data, dialed number, call type and translated number, may be provided to service request 34. A service configuration 40 contains the configured service information. Based on the service request type, the appropriate service configuration is selected. A billing validation service configuration 42 is the billing validation component of service configuration 40. A translation service configuration 44 is the translate digits configuration component of service configuration 40. A translator engine 46 receives service request 34 and service configuration 40 and executes the selected service functions. Based on the service request 34 and service configuration 40, a number of functions may be invoked: a validation function 48, a screening function 50, and a call routing function 52.

Validation functions 48 include validating account codes and billing. Account codes are specified on an ANI/CLI (automatic number identification/calling line identity) or authorization code basis. Validation function 48 receives the collected digits and compares them to an account code table stored locally or externally in a service control point 18. If a match is found, then the account code is valid. Billing validation is the validation of the billing entity, which may be an ANI/CLI, an authorization code, a calling card number, or a credit card number. The collected digits are compared to numbers in a local table or database or in service control point 18.

Call screening function 50 includes time of day (TOD) screening and called number (CLD) screening. Time of day screening determines whether the call is allowed based on the ANI/CLI or authorization code associated with the call and the time and day the call is originated. The determination may be done by accessing a time of day screening table pointed to by the corresponding entry in the ANI/CLI or authorization code table and obtaining the current day of the week or special day and time at the originating switch. Called number screening determines whether the call is allowed based on the ANI/CLI or authorization code associated with the call. It is done by accessing a domestic or internal called number screening table pointed to by the corresponding entry in the ANI/CLI or authorization code table. If a called number screening table is not specified at the ANI/CLI or authorization code level, a default called number screening index may be specified at the trunk group level. For domestic calls, screening may be done at the NPA (numbering plan area) or NPA-NXXX level. For international calls, screening may be done at the country code-city code level.

Call routing functions 52 provide a route list of a predetermined number of routes based on the calling area, the routing partition, and the time of day routing index. The calling area is determined by the NPA or country and city codes. Routing partitions are assigned according to the ANI/CLI, authorization code or the originating trunk group. The time of day routing index is assigned according to the routing partition. Each route in the route list includes a route type, the route (trunk group number), and the number of digits to outpulse on the trunk.

A translator database 54 may be accessed by validation, screening and call routing functions 48–52. A response message function 56 contains the response message services which is used to generate a raw output message 58. Raw output message 58 may be sent to digit collection client 16, trunk selection process 20, or call sequencer 22.

Figure 4:
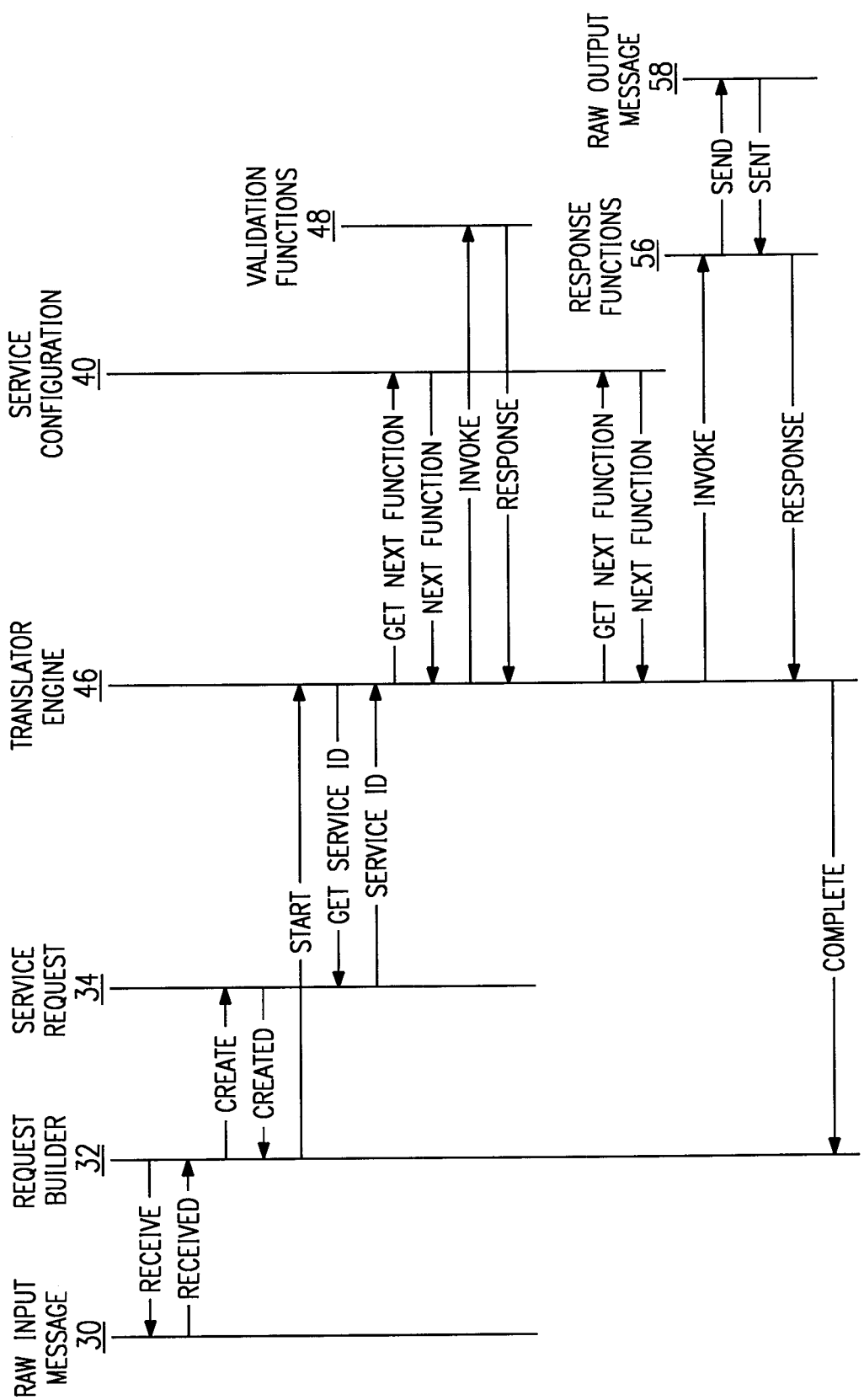
FIG. 4 is an interaction diagram for an exemplary billing validation service according to an embodiment of the present invention.

FIG. 4 is an interaction diagram for an exemplary billing validation service 11 according to the teachings of the present invention. Raw input message 30 from digit collection client 16 is received by request builder 32 which creates service request object 34, in this case containing a billing request, for ANI (automatic number identification) validation. Service request object 34 creates service configuration 40 containing billing validation service configuration for ANI billing validation. Translator engine 46 processes the request and the configuration. Service configuration 40 indicates that ANI billing validation function 48 should be executed. Finally, the response message function 56 builds a billing validation raw output message 58 that is sent back to digit collection client 16.

Figure 5:
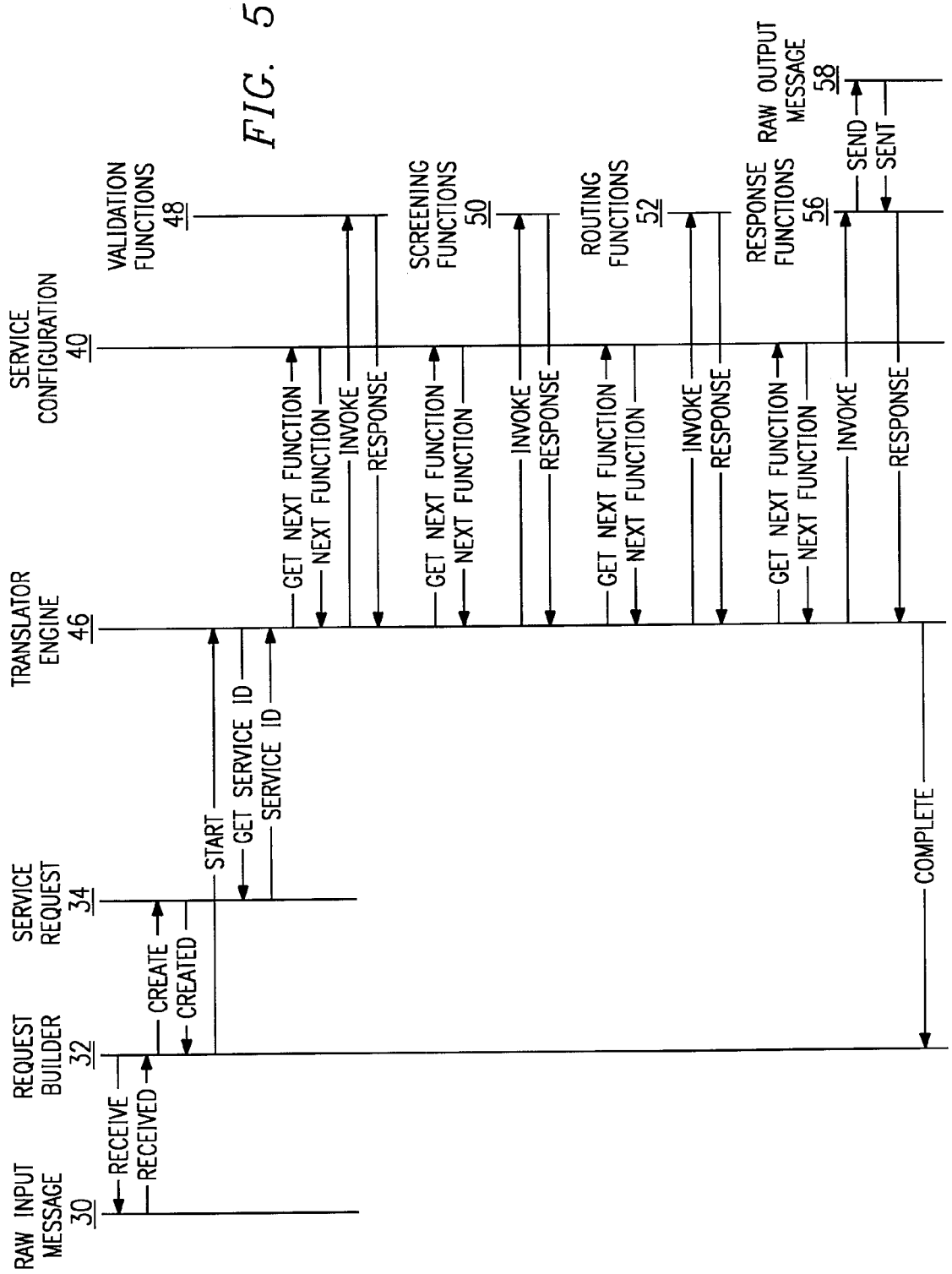
FIG. 5 is an interaction diagram for a calling card translation process according to an embodiment of the present invention.

FIG. 5 is an interaction diagram for an exemplary calling card translation process according to the teachings of the present invention. Raw input message 30 from digit collection client 16 is received by request builder 32 which constructs service request object 34, containing billing request 36 for calling card validation and translation request 38 for direct distance dialing (DDD) translation. Service request object 34 creates service configuration 40 containing the translation service configuration 44 for the credit card billing and DDD translation. Translator engine 46 then processes the requests and configuration. Translation service configuration 44 includes an indication that a credit card billing validation function 48 should be executed. Validation function 48 is performed, completing the calling card verification. Translation service configuration 44 also indicates that the incoming screening function 50 should be executed. Screening function 50 performs exclusion screening based on the data received from the validation information. Assuming screening is passed, the translation service configuration 44 indicates that call routing function 52 needs to be executed. In this case, it is DDD routing. Calls routing function 52 produces a set of routes. Translation service configuration 44 now indicates that the translate digit success response message function 56 should be executed. Response message function 56 then builds a translate data success raw output message 58 from the routing data and sends the information to trunk selection process 20.

Figure 6:
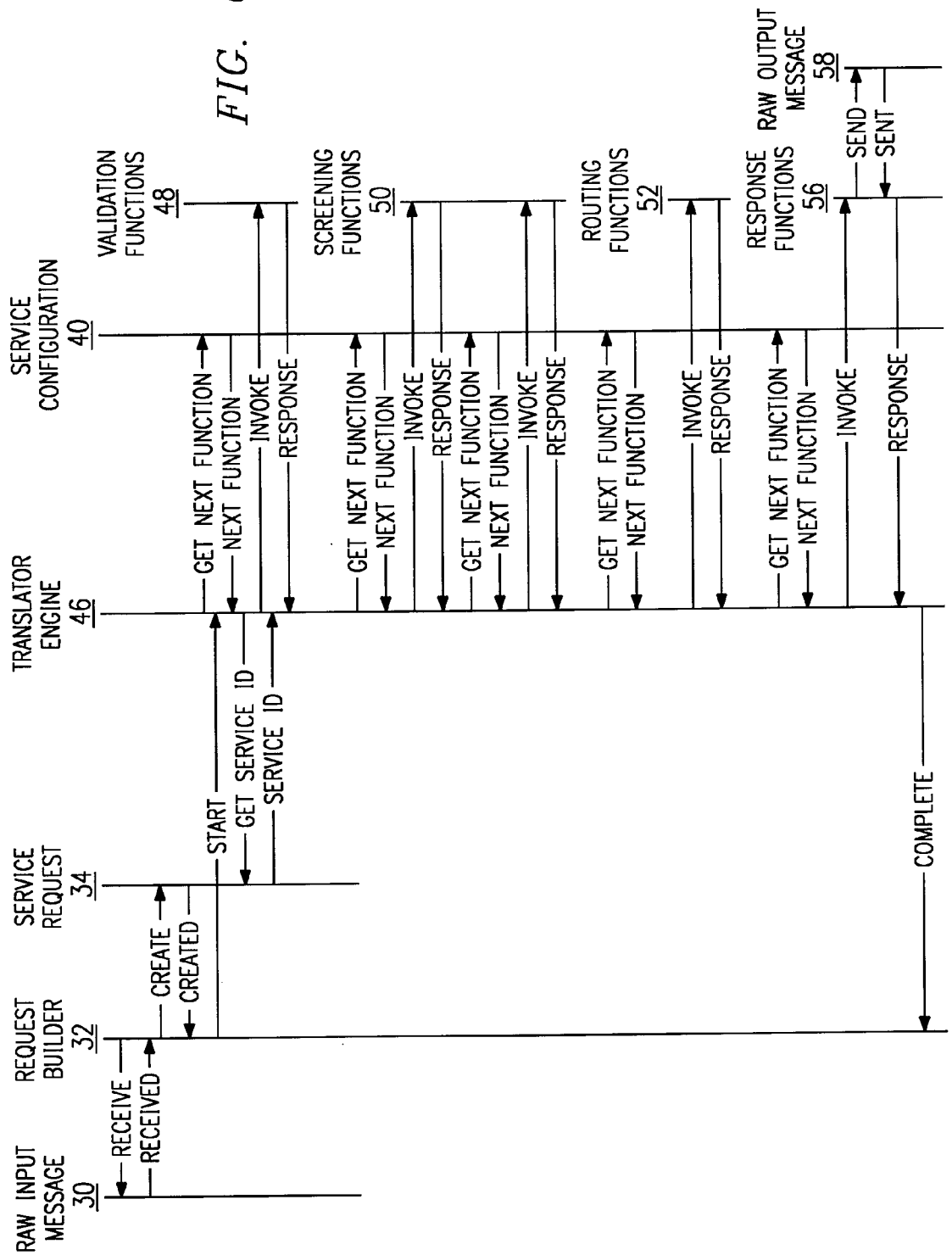
FIG. 6 is an interaction diagram for an exemplary authorization code translation according to an embodiment of the present invention.

FIG. 6 is an interaction diagram for an exemplary authorization code translation according to the teaching of the present invention. Raw input message 30 is received by request builder 32 which constructs service request object 34 including billing request 36 for prevalidated authorization code validation, and translation request 38 (translation request not shown in FIG. 6). Service request object 34 creates service configuration 40 containing translation service configuration 44 for a prevalidated authorization code call and DDD translation. Translator engine 46 for DDD translation processes the requests and configurations. Translation service configuration 44 indicates that validation function 48 for account code validation should be executed. Validation function 48 verifies the account code against translator database 54. Next, translation service configuration 44 indicates that time of day originating screening function 50 should be executed. The screening function 50 executes and, in this example, passes. Translate service configuration 40 then indicates that incoming exclusion screening functions 50 should be executed. Screening function 50 performs the exclusion screening based on the data received from the external validation. Translation service configuration 44 then indicates that DDD call routing function 52 should be executed. DDD call routing function 52 is executed and a list of available routes is built. Translation service configuration 44 indicates that translate digit success response message function 56 should be executed. Response message function 56 builds a translate digit success raw message output 58 from the routing data and sends the response to trunk selection process 20.

Figure 7:
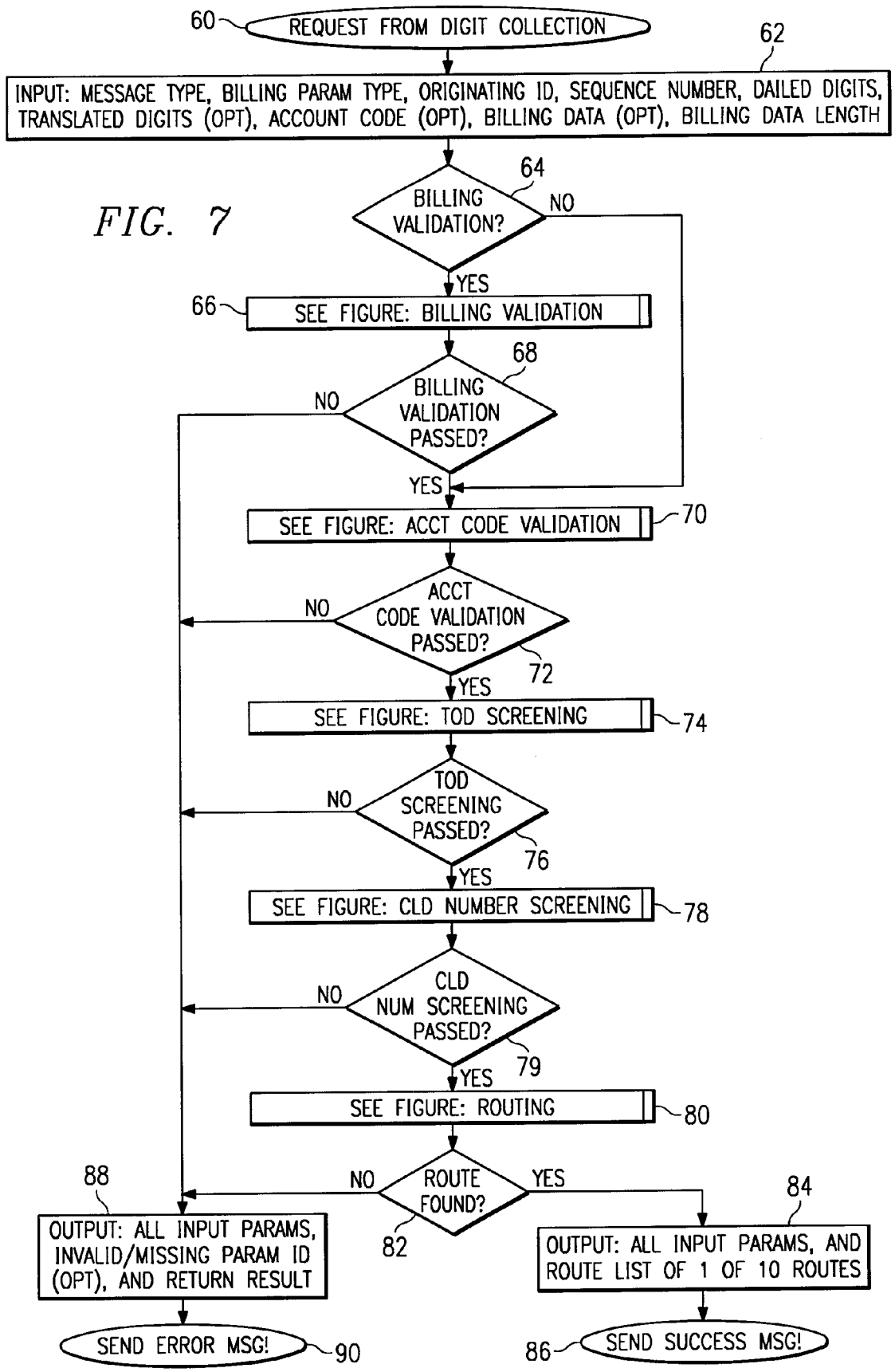
FIG. 7 is a flow chart of the generic translator.

FIG. 7 is a flow chart of the generic translation 10. In step 60 a request for digit translation 13 from digit collection client 16 is made. A raw input message 30 having the message type, billing parameter type, originating identifier, sequence number, dialed digits, translated digits, account code, billing data, and billing data lengths, is formulated in step 62. In step 64, generic translator 10 determines if billing validation 11 is needed. Billing validation 11 occurs in step 66 as outlined in FIGS. 8a and 8b described below. If billing translation is not required, step 70 determines if account code validation 15 is required. Step 70 is also reached upon successful billing validation 11 in step 66. Failure in billing validation 11 would cause an output message to be formulated in step 88 and an error message sent in step 90. Returning to step 70, account code validation 15 is shown in FIG. 9 and described below. If account code validation 15 is passed or if no account code validation 15 is required, the process moves to time of day screening in step 74. Failure in account code validation 15 also results in a raw output message 58 being formulated and an error message sent in steps 88 and 90. Time of day screening is discussed in FIG. 10. If time of day screening is passed or is not needed, the process moves on to step 78 where called number called number screening occurs. If time of day screening fails, steps 88 and 90 execute to send an error message. Called number screening is analyzed in FIG. 11. If called number screening is successful or not needed, call routing 19 occurs in step 80. If not steps 88 and 90 are invoked to send an error message. Call routing 19 is analyzed in FIGS. 12a and 12b. If a route is found a raw output message 58 is formulated in step 84 and a success message is sent in step 86. If routing is unsuccessful, steps 88 and 90 are invoked to send an error message.

Figure 8A:
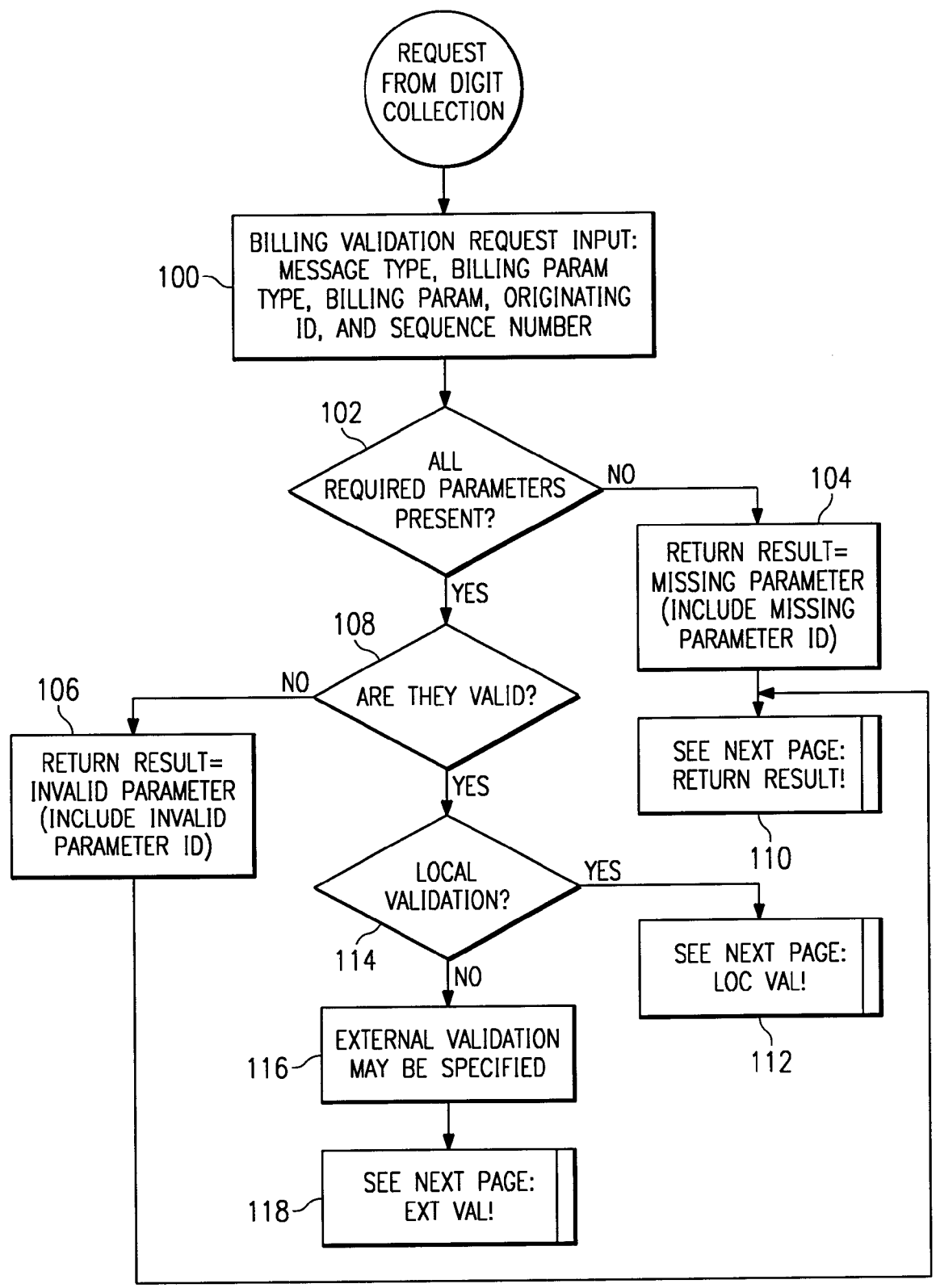
FIGS. 8a and 8b are flow charts of the billing validation process according to an embodiment of the present invention.
Figure 8B:
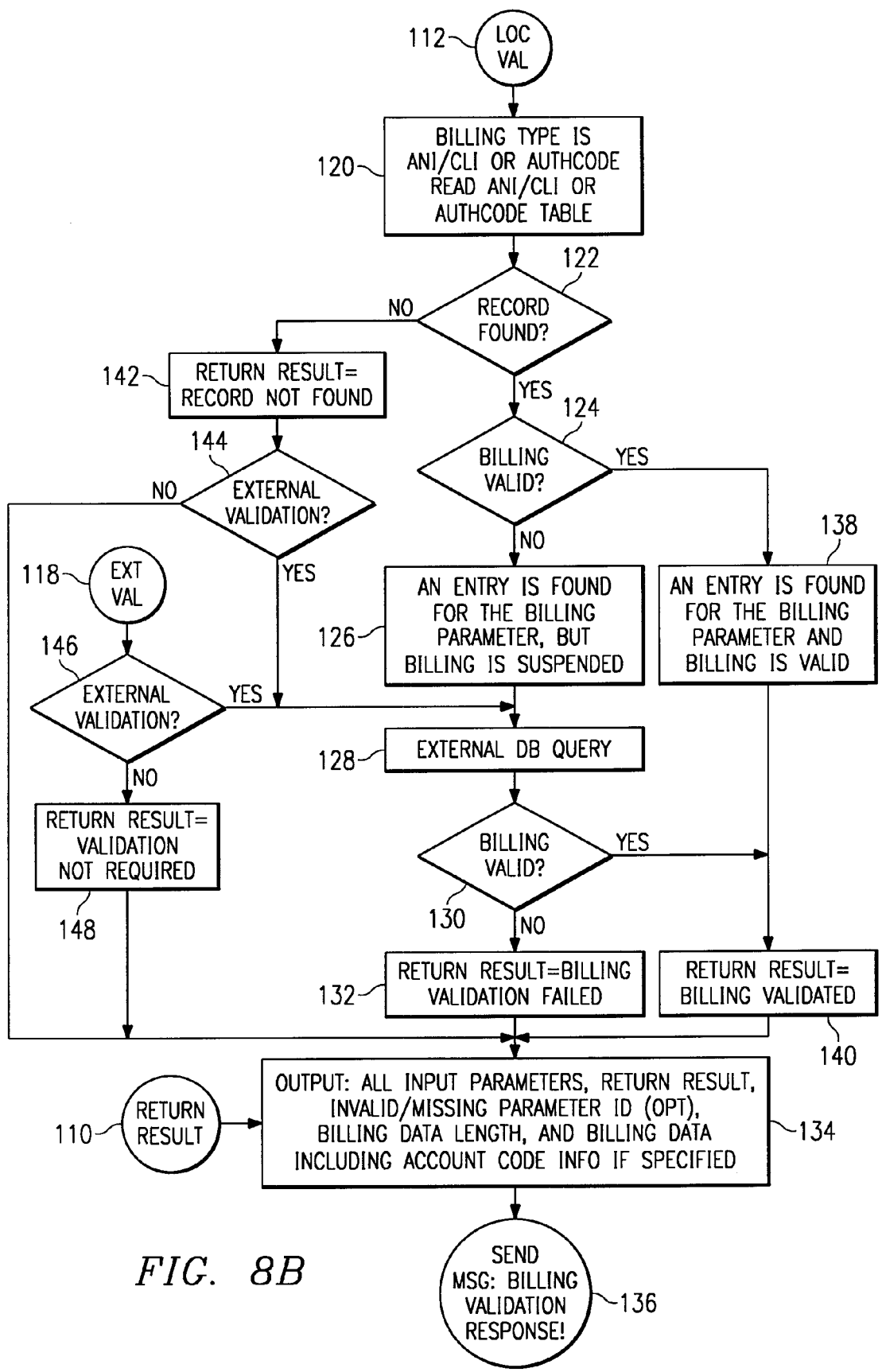
Figure 9:
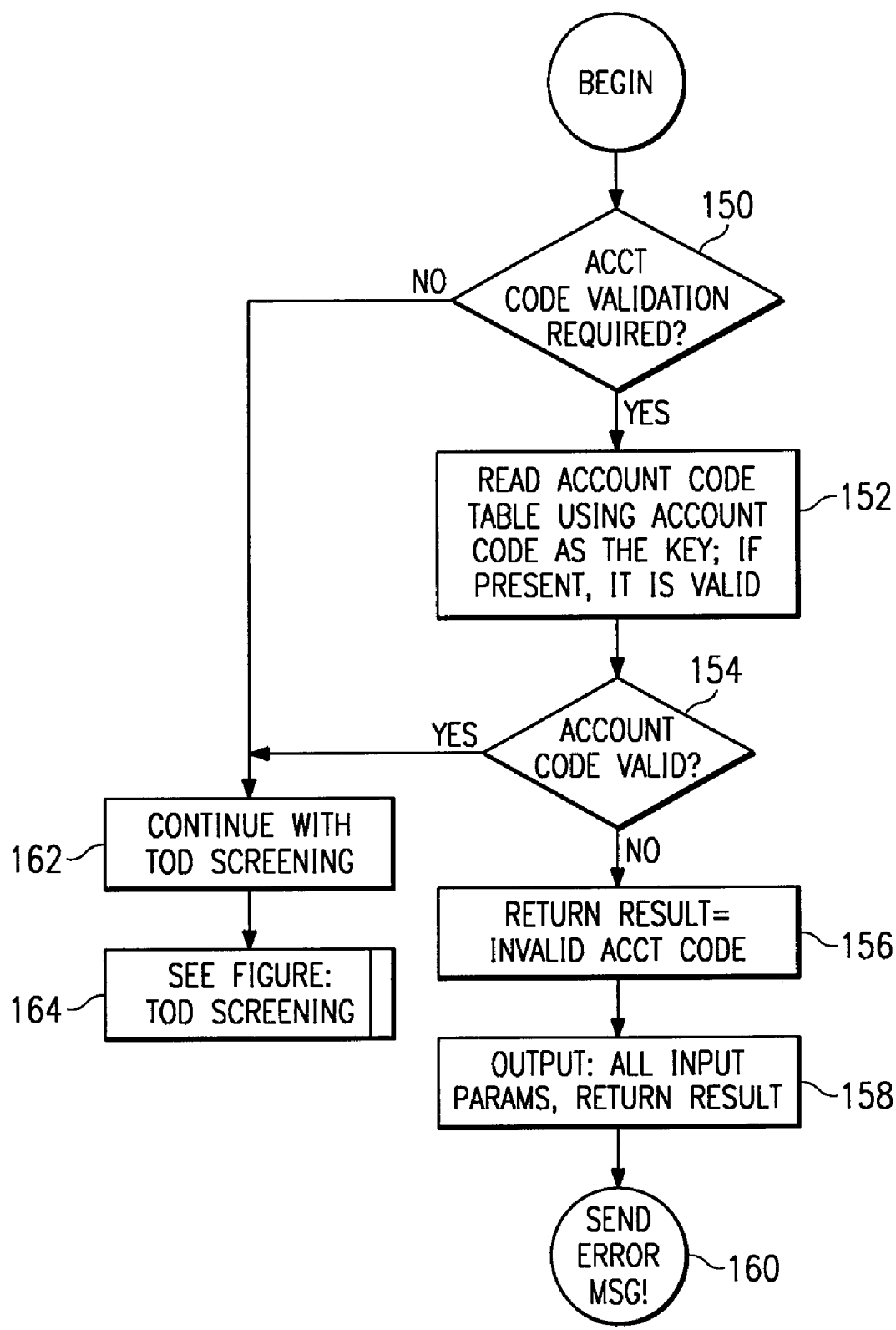
FIG. 9 is a flow chart of the account code validation process according to an embodiment of the present invention.

FIGS. 8a and 8b are flow charts that illustrate billing validation 11. A request from a digit collector 16 is received at step 60. Since this is billing request 36, a billing message is formulated in step 100. It includes the message type, billing parameter type, billing parameter origination identification, and sequence number. In step 102, whether all parameters for billing validation 11 are present is determined. If not a return result of missing parameters is formulated in step 104 and is analyzed in FIG. 8b (step 110). If all parameters are present, step 108 determines if all parameters are valid. If not, in step 118 an invalid message is formulated and the analysis passes to FIG. 8b. If the parameters are valid, step 114 determines if local validation is required. If so, local validation starts at step 112 of FIG. 8b. If not external validation may be specified in steps 116 and analysis continues in FIG. 8b.

In step 110 of FIG. 8b, the return results from step 106 (invalid parameters) or 104 (missing parameters) of FIG. 8a is used to formulate an output message 20 in step 134 and is sent as an unsuccessful validation response in step 136. If local validation is required in step 112, billing type is determined in step 120 and records are searched. Billing code can be ANI/CLI or AUTH code. If the records are found in step 122, then whether the billing is valid is determined in step 124. If records are not found in step 122 the return result of records not found is formulated in step 142. Step 144 determines if external billing validation is required. If it is not, an output message reflecting record not found is formulated and sent in steps 134 and 136. If external validation is required an external database is queried in step 128. Referring back to step 124, if the billing is valid and an entry is found for the billing parameter, the billing is determined to be valid in step 138. In step 140 a return result of billing valid is formulated and sent in steps 134 and 136. If a record is found but not properly validated, billing is suspended in step 126. If this is true an external database query is performed in step 128. Step 128 also performs an external database query if a record was not found in step 112. If the external validation is successful, the billing is valid and steps 140, 134 and 136 return a result message indicating success. If not, step 132 sends a return result of billing validation failed and an output message is sent in steps 134 and 136. Finally if external validation was suspected in FIG. 8a, generic translator 10 determines if external validation is required in step 146. If not, a return result of validation not required is formulated in steps 148 and an output message sent in steps 134 and 136. If external validation is required in step 146, an external database query occurs in step 128. A successful query follows the steps of 130, 140, 134 and 136 as discussed before. A failed query follows steps 130, 132, 134 and 136 as discussed before.

Figure 10:
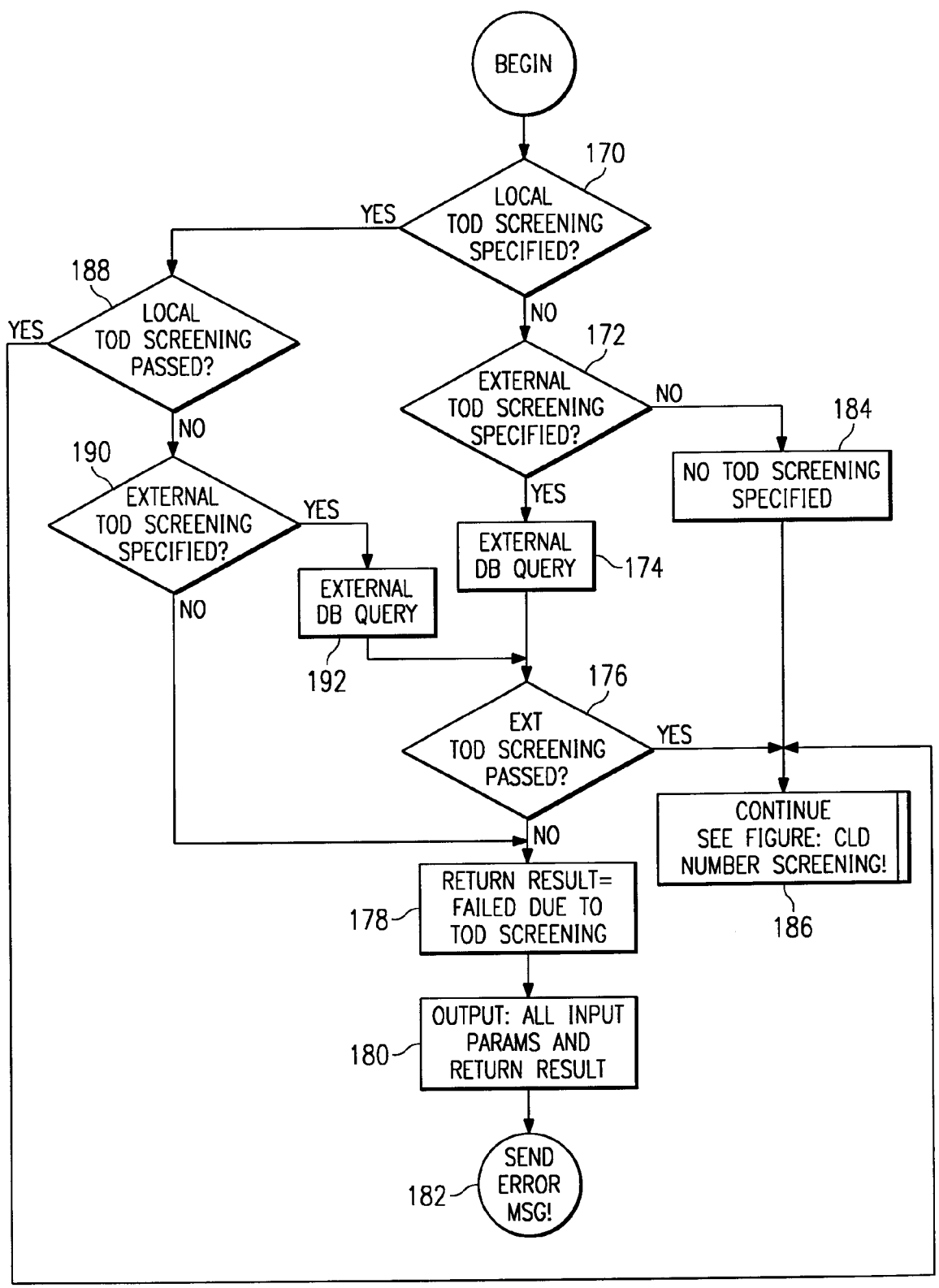
FIG. 10 is a flow chart of the time of day screening process according to an embodiment of the present invention.

FIG. 9 is a flowchart that illustrates an exemplary account code validation 15. Whether account code validation 15 is required is determined in step 150. If validation is not required, time of day screening is initiated in step 162. The details of time of day screening is shown in FIG. 10 and described below. If account code validation 15 is required, the account code table is read using the account code as a key in step 152. In step 154, the validity of the account code is determined. If the account code is valid, time of day screening commences at step 162. If the account code is invalid, a return result of invalid account code is formulated in step 156, an output message is formulated in step 158 and an error message is sent in step 160.

FIG. 10 is a flow chart that illustrates an exemplary time of day screening. In step 170, whether local time of day screening is required is determined. If local screening is not required, whether an external time of day screening is required is determined in step 172. If local time of day screening is required, its success is checked in step 188. When successful local time of day screening is completed, step 186 initiates called number screening, which is discussed in FIG. 11. If local time of day screening fails in step 188, it is determined in step 190 if external time of day screening is required. If external time of day screening is required in either step 172 or 190, an external database query occurs in step 174 and 192, respectively. If the external database query is successful in steps 174 or 192, called number screening is initiated in step 186. If external time of day screening is not required in step 190, or if external time of day screening fails in step 174 or 192, a return result of failed time of day screening is produced in step 178, an output is formulated in step 180 and an error message produced in steps 182. If, in step 172, external time of day screening was not required, called number screening would begin at step 186.

Figure 11:
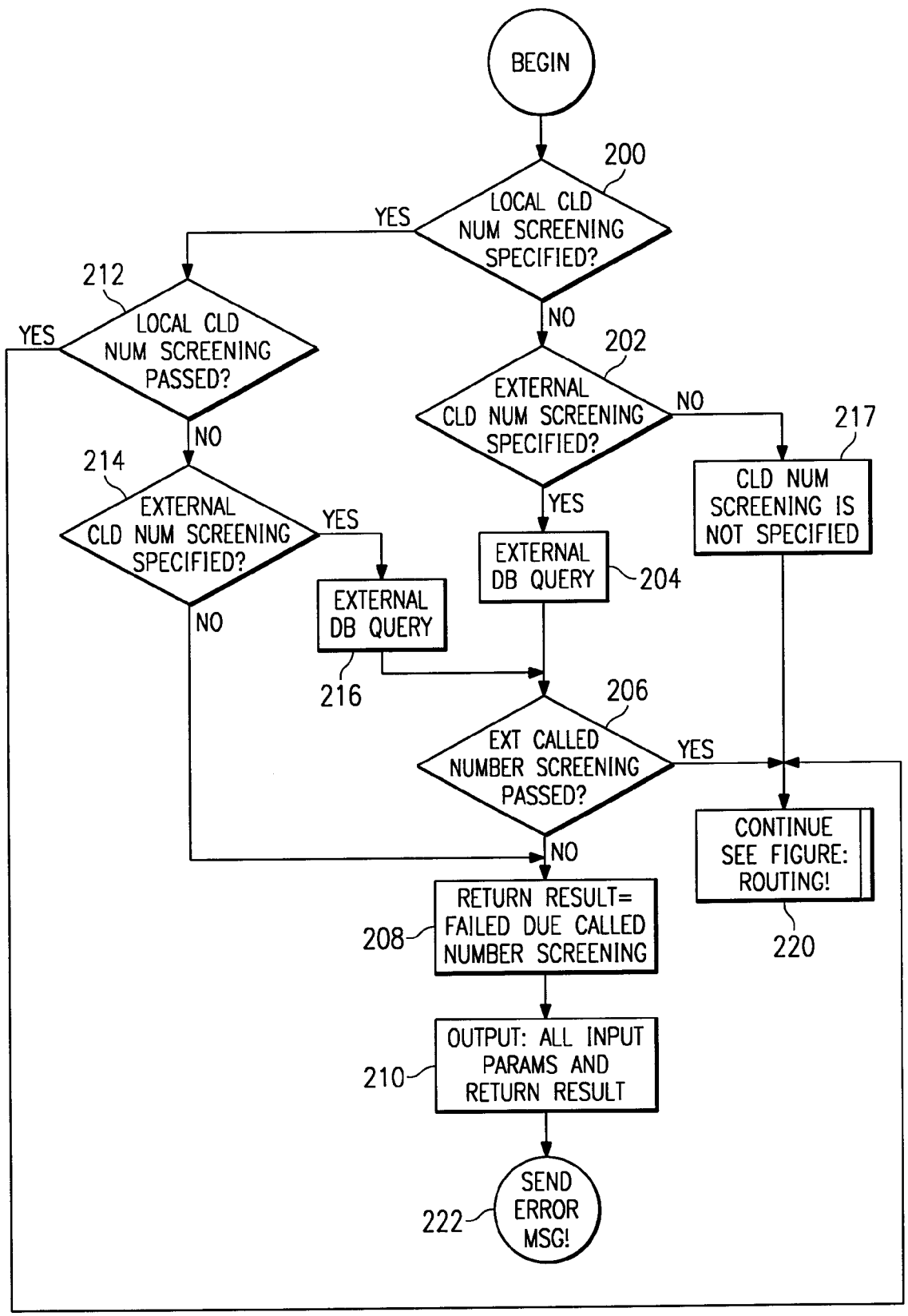
FIG. 11 is a flow chart called number screening process according to an embodiment of the present invention.

FIG. 11 is a flow chart that illustrates an exemplary called number screening. Initially, in step 200, it is determined if local called number screening is required. If local called number screening is not specified, it is determined if external called number screening is required in step 202. If external called number screening is not required then call routing is initiated in step 220 as discussed in FIGS. 12a and 12b. If external called number screening is required in step 202, an external database query occurs in step 204. A successful screening leads to the initiation of call routing in step 220. An unsuccessful screening results in a return result of failure due to called number screening in step 208, an output message is formulated in step 210 and an error message is sent in step 222. Considering step 212, if local called number screening is passed, call routing is initiated in step 220. If local called number screening fails, it is determined if external called number screening is required in step 214. If external called number screening is not required, then an error message is sent in step 222. If external called number screening is required, an external database query occurs in step 216. A successful query leads to the initiation of call routing in step 220. A failed query results in an error message at step 222.

Figure 12A:
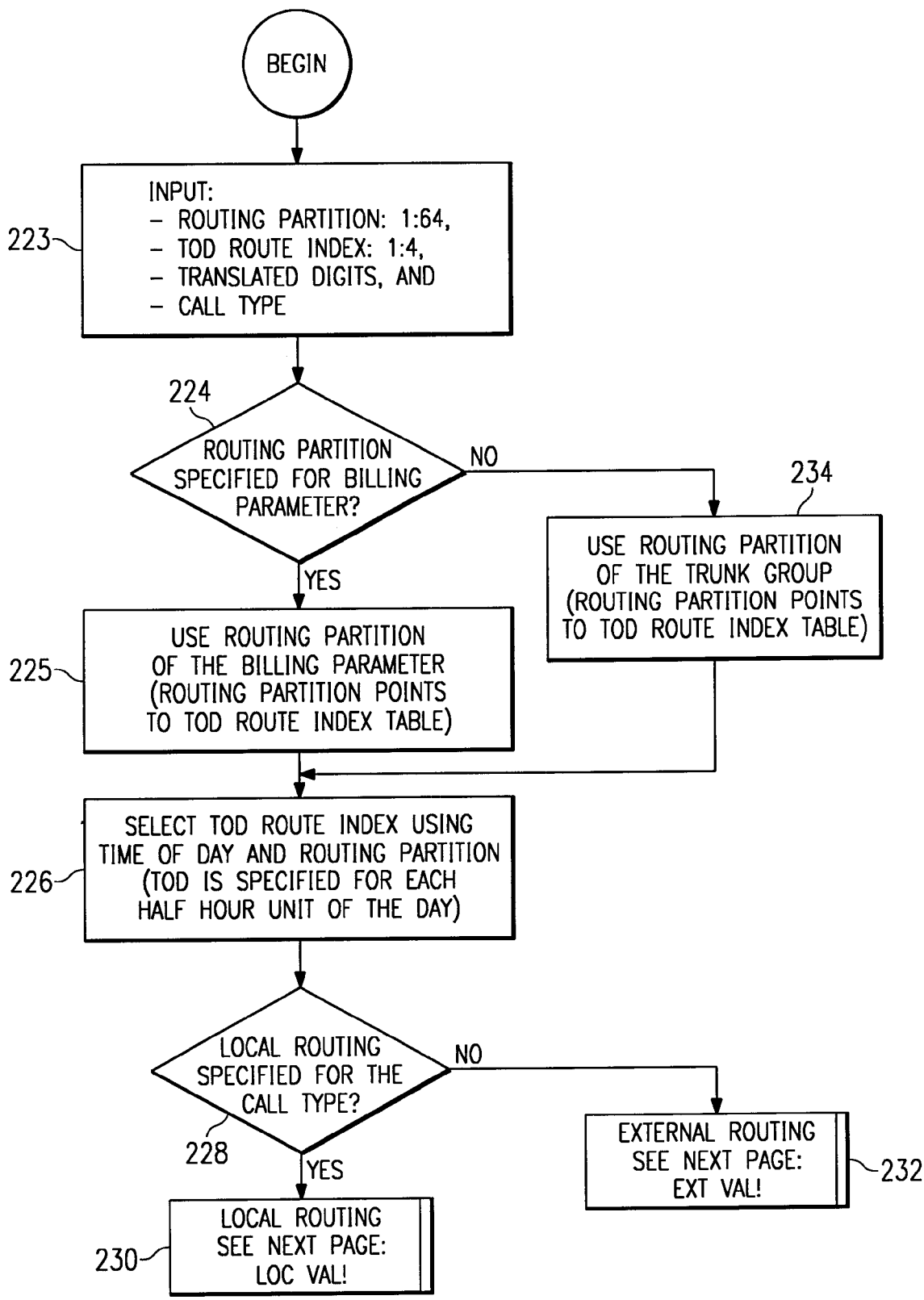
FIGS. 12a and 12b are flow charts of the call routing process according to an embodiment of the present invention.
Figure 12B:
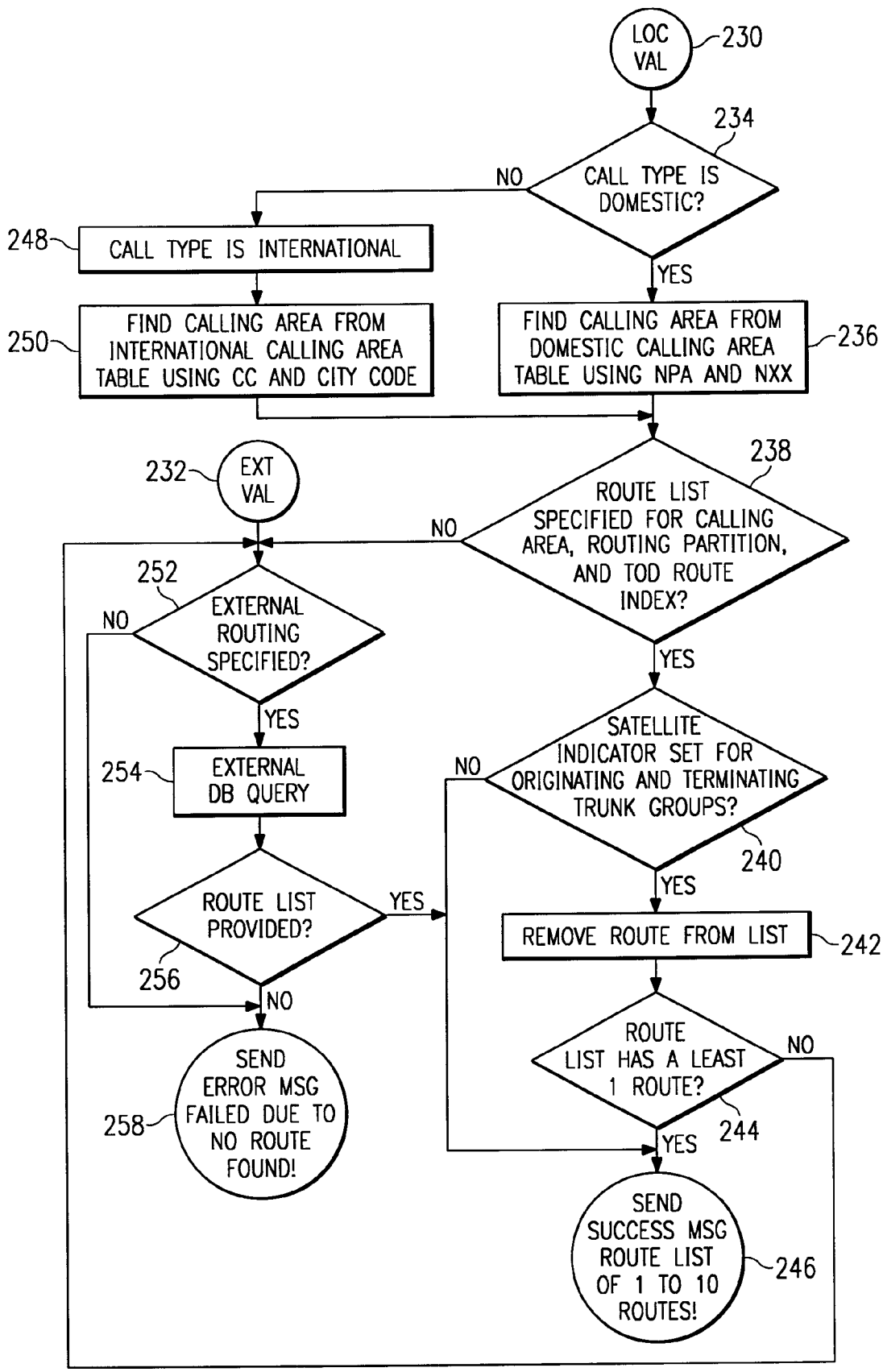

FIGS. 12a and 12b are flowcharts that illustrates exemplary call routing 19. In step 223 an input containing the call type, translated digits, time of day route index and routing partition is assembled. In step 224, it is determined if the routing partition is specified for the billing parameter. If it is, the billing parameter determines the routing partition in step 225. If not, in step 234 the routing partition from the trunk group is used. In step 226, the TOD routing index is used. Step 228 determines if local screening is required. If it is, step 230 initiates local routing in FIG. 12b. If not, external routing is analyzed in step 232 and FIG. 12b.

Referring to FIG. 12b at step 230 local routing is initiated. If the call is a domestic call, the calling area is found from a table using the numbering plan area and end office code in step 236. If a route list is specified in step 238, step 240 determines if a satellite indicator is set for originating and terminating trunk groups. If not, a route list is sent in step 246. If a satellite indicator is set for originating and terminating trunk groups, a route is removed from the list in step 242. If at least one route remains it is sent along in step 244 to step 246. If not, external routing is analyzed in step 252. Step 252 is also reached if external routing was required in step 232 of FIG. 11a. If external routing is specified, an external database query is done in step 254. If this produces a route list in step 256 a success message is sent in step 246. If no route is given, an error message is sent in step 258. Step 258 is also reached if external routing is not specified in step 252. If in step 234 it is determined the call type is international, the calling area is determined from country code and the city code. The remaining process is the same as for domestic calls.

Turning away from specific use cases, generic translator framework 12 provides the basic infrastructure or building blocks from which customer specific translator applications can be built. Generic translator application components 14 are components that provide the basic functionality such as call screening, validation and call routing. One focus in the design of generic translator 10 is extensibility, i.e., providing a framework that can be extended without changing the framework. Therefore, while certain generic translation functions are provided for, the framework allows quick and easy development of certain applications. In one embodiment, generic translator 10 is developed using an object oriented programming language such as C++. Generic translator framework 14 comprises a plurality of groupings of classes, or cluster of classes. Classes are groupings of variables, arrays, strings and functions in an object oriented programming language such as C++ that is used to model objects.

The following are examples of class clusters in the generic translator framework:

Initialization

Service Request

Request/Timing Processing

Service Management

Call Block

Service Functions

Database

The initialization cluster is responsible for initializing generic translator 10. The service request cluster allows an application to create a service request, validate the request, create or formulate a response to a request, send a response to a request and to determine an initial service. The request timing processing cluster is used to determine when to execute a service. The service management cluster manages and executes the services that are available. The call block cluster is used to store transient data that will be used by other clusters. The translator service functions cluster provides the service function for translator operations. Finally, the database cluster provides the generic translator with the ability to access external database records.

The following is a list of classes from the above list of class clusters as well as that class's function. Classes which begin TRGen belong to the generic framework classes 12, those labeled with TrApp are classes which belong to the generic translator application compound 14, and those that begin with SM belong to the generic state machine object groupings. The generic state machine is discussed in a provisional application, U.S. Ser. No. 60/030,824 and is hereby incorporated by reference.

Figure 13:
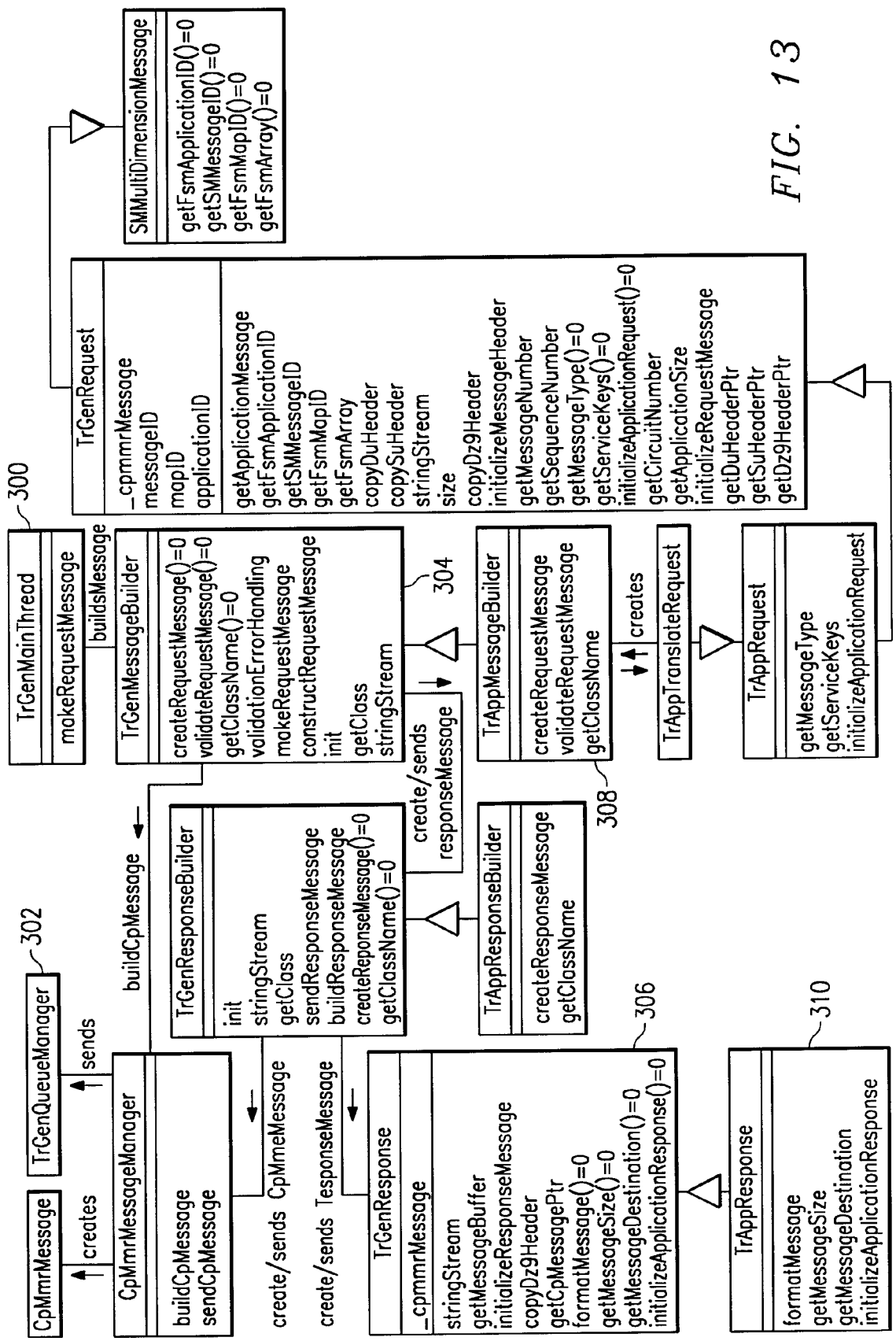
FIG. 13 is a diagram of the classes for the service request cluster process according to an embodiment of the present invention.

FIG. 13 illustrates the classes for the service request cluster. Some of the more important classes include:

ClassName: TrGenMainThread 300

Purpose: TrGenMainThread 300 is the main thread class of the Generic Translator. It is derived from the state machine thread class, SMMainThread. It is responsible for reading the request from the queue manager (TrGenQueueManager), building the request object and passing the request object to the translator TrGenCallBlockArray.

ClassName: TrGenQueueManager 302

Purpose: TrGenQueueManager 302 class receives and sends OsMessages to and from the Translator Application.

ClassName: TrGenMessageBuilder 304

Purpose: TrGenMessageBuilder 304 is an abstract class that takes the raw input data and calls a method in the base class to create the input request message object. TrGenMessageBuilder also starts the validation process of the input request message object.

ClassName: TrGenResponse 306

Purpose: TrGenResponse is an abstract class that hides the base class. It contains the methods for accessing the circuit number, sequence number, selective receive code and any other information contained within the CpMessage class.

ClassName: TrAppMessageBuilder 308

Purpose: TrAppMessageBuilder creates the input request message object. TrAppMessageBuilder handles the basic message sanity checks (validation), such as, message type unknown, required fields missing or invalid, etc.

ClassName: TrAppResponse 310

Purpose: TrAppResponse encapsulates the Response Message. It contains the response elements in a generic format.

Figure 14:
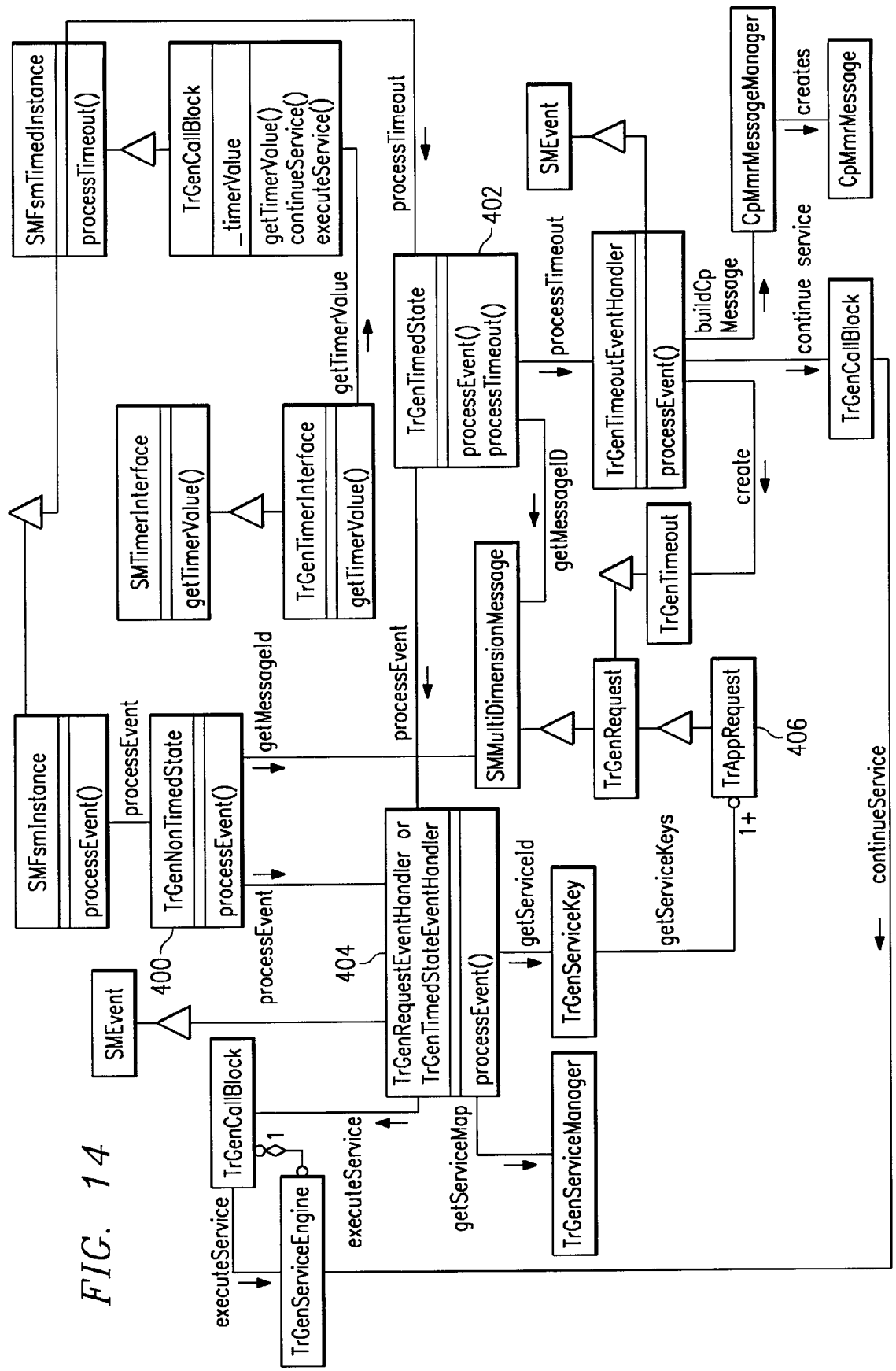
FIG. 14 is a diagram of the classes for the request/timing processing cluster process according to an embodiment of the present invention.

FIG. 14 illustrates the classes for the request/timing processing cluster. Som of the important classes include:

ClassName: TrGenNonTimedState 400

Purpose: TrGenNonTimedState is the initial state class for the generic translator. It receives the process input message event from the FSM (call block). Upon entry into this state the call block is initialized in preparation of a request event. Upon receiving a request event the TrGenRequestEventHandler is invoked.

ClassName: TrGenTimedState 402

Purpose: TrGenTimedState is the state class in the generic translator used to wait for remote query responses. Upon receipt of a response message or time-out event the TrGenRequestEventHandler is invoked.

ClassName: TrGenRequestEventHandler 404

Purpose: TrGenRequestEventHandler processes the request message. On a request event, it use the TrGenServiceKey class to determine the service. Once a service is determined, it uses the service manager to get the service map for the request. On a time-out event/response event it either continues service processing or determines a new service to process. The service engine is then invoked to continue processing the existing service.

ClassName: TrAppRequest 406

Purpose: TrAppRequest encapsulates the request message. It contains the request elements in a generic format.

Figure 15:
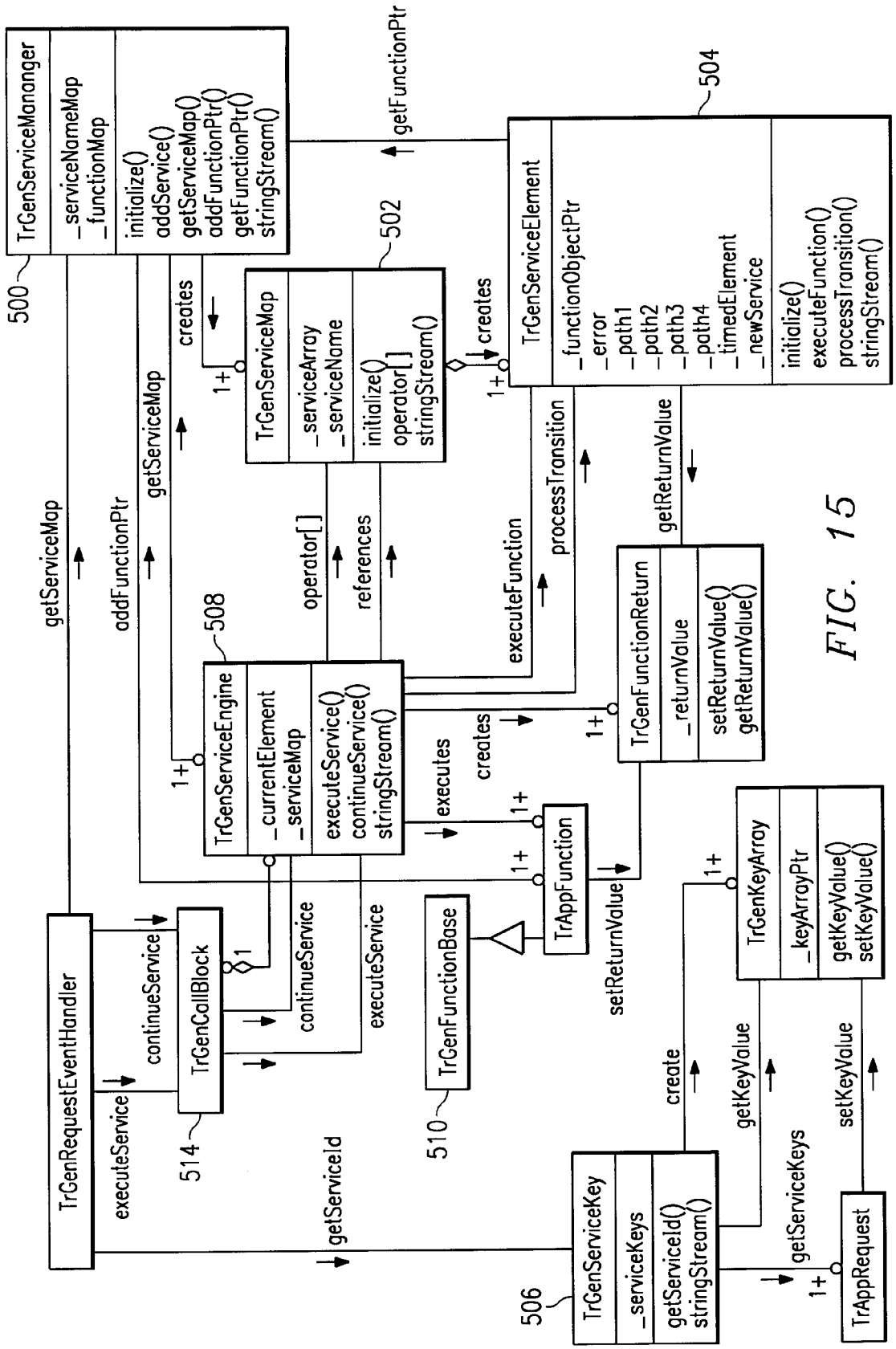
FIG. 15 is a diagram of the classes for the service management cluster process according to an embodiment of the present invention.

FIG. 15 illustrates the service management cluster. Some of the more important classes include:

ClassName: TrGenServiceManager 500

Purpose: TrGenServiceManager 500 manages the service map database. TrGenServiceManager 500 contains pointers to all the TrGenServiceMaps which exist in the translator. For execution of a particular service map, TrGenServiceManager uses the service identifier provided by TrGenRequestEventHandler, to obtain a pointer to the associated service map to execute.

ClassName: TrGenServiceMap 502

Purpose: TrGenServiceMap 502 defines the sequence of functions for a service. It is a collection of ordered service elements. The service elements contained in the map contain the translator function to execute and the next service element to execute based on the executed function's returned action. The service engine handles the processing of the service elements within a service map.

ClassName: TrGenServiceElement 504

Purpose: TrGenServiceElement 504 contains the information for each element of the service sequence. The elements contain the service function pointer (i.e. the function to execute) and the service elements within the map to invoke on a function return action (e.g. error, path). The service element may thus redirect processing, based on function return, to any service element within the current service map. The service element also has the capability to redirect processing to the first service element of another service map, or to a new state.

ClassName: TrGenServiceKey 506

Purpose: TrGenServiceKey 506 contains the service key database. TrGenServiceKey is called by TrGenRequestEventHandler to return the service identity string for the call being processed. (The service identity will be used to retrieve from TrGenServiceManager the service map to execute for this call.) TrGenServiceKey requests from a TrGenRequest derived class (TrAppRequest) the service keys to use to form the service identity. These keys returned by TrAppRequest to TrGenServiceKey is a list of keys. Each key in the list specifies a key number and an entry offset for that key. TrGenServiceKey uses these two items to retrieve from its database an associated key string. All such key strings obtained using the service array are summed together to form the service identifier.

ClassName: TrGenServiceEngine 508

Purpose: TrGenServiceEngine 508 is the class that executes the service. It receives the service map from the TrGenRequestEventHandler class. This class contains methods to allow the first element or a specified element of a service map to be executed. The service engine retrieves from the service element, and executes via a method pointer, the service function contained therein. The return from the service function indicates to TrGenServiceEngine how to proceed:—continue to another service element, service map execution complete; state change or new service. The state change return also provides the next service function to invoked. This service element and the current service map will be stored in TrGenCallBlock if a transition to the TrGenTimedState occurs. This allows this service function to be executed (without service map determination via keys) when an event in the TrGenTimedState is received.

ClassName: TrGenFunctionBase 510

Purpose: TrGenFunctionBase provides the base class for the service functions. Due to the nature of C++ in order to maintain a simple collection of method pointers they must all be the same type. TrGenFunctionBase provides that type.

ClassName: TrGenFunctionReturn 512

Purpose: TrGenFunctionReturn encapsulates the return status from the service functions. The class contains the return status (done, error, path1, path2, path3, path4, new service, timed state, non-timed state).

ClassName: TrGenCallBlock 514

Purpose: TrGenCallBlock is the central finite state machine object and data repository of the generic translator. TrGenCallBlock provides storage for a timer value, access to the SUDU message header and service map information.

The generic translator application components are classes which provide specific functionality to the generic translator. Some of the classes in the generic translator application components include:

ClassName: TrAppValidationFunction

Purpose: TrAppValidationFunction is a generic name for any application specific validation function. The following functional areas would be candidates for an application validation function:
ANI validation;
Authorization code validation;
Account code validation; and
Credit card validation external validation (external interface not defined).

ClassName: TrAppScreeningFunction

Purpose: TrAppScreeningFunction is a generic name for any application specific screening function. The following functional areas would be candidates for an application screening function:
Time of day screening;
Satellite screening;
Incoming exclusion screening; and
International (IDDD) screening.

ClassName: TrAppRoutingFunction

Purpose: TrAppRoutingFunction is a generic name for any application specific screening function. The following functional areas would be candidates for an application routing function:
Initialize routing;
Get next route choice;
Store in route list;
Get partition from request;
Get partition from ANI DB;
Get partition from authcode DB;
Get partition from translation DB; and
Time of day routing.

ClassName: TrAppResponseFunction

Purpose: TrAppResponseFunction is a generic name for any application specific response function. The following functional areas would be candidates for an application response function:
Build validation response message;
Build translation success message; and
Build translation failure message.

ClassName: TrAppCallBlock

Purpose: TrAppCallBlock is the data repository of an application specific translator.

ClassName: TrAppSubscriberDB

Purpose: TrAppSubscriberDB provides the base class for the two subscriber database tables, the ANI table and the Authcode table. It provides the common data between the two tables, such as:
number of account code digits;
IDDD restriction indicator;
account code validation required indicator;
routing partition;
Incoming exclusion database key account code; and
database key time restriction database key.

ClassName: TrAppAniDB

Purpose: TrAppAniDB is the database class for the ANI subscriber table. It provides the ANI specific database access mechanisms.

ClassName: TrAppAuthCodeDB

Purpose: TrAppAuthCodeDB is the database class for the authcode subscriber table. It provides the authcode specific database access mechanisms.

ClassName: TrAppAccountCodeDB

Purpose: TrGenAccountCodeDB is the database class for the account code table. It contains the account code information and account code digits map.

ClassName: TrAppTranslationDB

Purpose: TrAppTranslationDB is the database class for the translation table. It contains the trunk group based translation data, including:
routing partition;
satellite indicator;
reroute required indicator;
time of day adjustment; and
authcode validation required indicator.

ClassName: TrAppTimeRestrictionDB

Purpose: TrAppTimeRestrictionDB is the database class for the time of day restriction table. It contains the time of day restriction data and day of year restriction map.

ClassName: TrAppIncomingExclusionDB

Purpose: TrAppIncomingExclusionDB is the database class for the incoming exclusion table. It provides exclusions based on dialed and/or translated number. It includes the domestic (DDD) exclusion list and the international (IDDD) exclusion list.

ClassName: TrAppRoutingDB

Purpose: TrAppRoutingDB is the database class for the routing database. It contains the routing choice information grouped into route choice lists and includes trunk group number digit outpulse information ClassName: TrAppTimeOfDayRouteDB Purpose: TrAppTimeOfDayRouteDB contains the time of day route information that modifies the route selection based on time of day. It contains part of the key to accessing the routing database.
route index for accessing the routing database Although the present invention and its advantages have been described in detail, it should be understood that various changes, substitutions, and alterations can be made therein without departing from the spirit and scope of the invention as defined by the appended claims.

What is claimed is:

1. A method for time of day screening in a generic translator comprising the steps of:
receiving input digits;
formulating a raw input message from the input digits, the raw input message including information pertaining to a plurality of call processing requests;
generating a service request object in response to the raw input message, the service request object includes information according to the plurality of call processing requests in a generic form;
invoking a time of day screening function in response to the service request object including a time of day screening request;

performing a time of day screening; and returning a result message.

2. The method of claim 1, wherein the step of returning a result message further comprises returning a failure message when time of day screening fails.

3. The method of claim 1, wherein the step of returning a result message further comprises returning a success message when time of day screening succeeds.

4. The method of claim 1, wherein the step of performing a time of day screening further includes performing a local time of day screening when specified.

5. The method of claim 1, wherein the step of performing a time of day screening further includes performing an external time of day screening when specified.

6. A method for called number screening in a generic translator comprising the steps of:

receiving input digits;

formulating a raw input message from the input digits, the raw input message including information pertaining to a plurality of call processing requests;

generating a service request object in response to the raw input message, the service request object includes information according to the plurality of call processing requests in a generic form;

invoking a called number screening function in response to the service request object including a called number screening request;

performing a called number screening; and returning a result message.

7. The method of claim 6, wherein the step of returning a result message further comprises returning a failure message when called number screening fails.

8. The method of claim 6, wherein the step of returning a result message further comprises returning a success message when called number screening succeeds.

9. The method of claim 6, wherein the step of performing a called number screening further includes performing a local called number screening when specified.

10. The method of claim 6, wherein the step of performing a called number screening further includes performing an external called number screening when specified.

* * * * *